United States Patent [19]

Page

[11] 3,949,480

[45] Apr. 13, 1976

[54] MOBILE DENTAL CONSOLE

[76] Inventor: Richard W. Page, Box 258B, Chatham, Mass. 02633

[22] Filed: Feb. 26, 1971

[21] Appl. No.: 119,097

[52] U.S. Cl. .................... 32/22
[51] Int. Cl.² .................... A61C 19/02
[58] Field of Search .................... 32/22

[56] References Cited

UNITED STATES PATENTS

| | | | |
|---|---|---|---|
| 3,160,379 | 12/1964 | Gardella | 32/22 |
| 3,229,368 | 1/1966 | Tocchini | 32/22 |
| 3,650,033 | 3/1972 | Behne | 32/22 |

OTHER PUBLICATIONS

Chayes Dentzl Instrument Corp., pp. 1 and 2, Apr. 1968.

*Primary Examiner*—Robert Peshock

[57] ABSTRACT

A caster mounted dental console unit has a vertically adjustable cantilever housing containing the instrument hoses or cables, along with hose-holding clips and air selector valves and hose connections therefor. The overhanging end of the housing has a panel with apertures for receiving and holding a number of instruments when not in use and a slant shelf positioned below such insruments and serving to prevent foulthereby of the hose for a selected instrument while such instrument is in use.

7 Claims, 6 Drawing Figures

INVENTOR.

BY Richard W. Page

Sawyer & Kennedy
Attys.

INVENTOR.

Richard W. Page

By Sawyer & Kennedy

Attys

MOBILE DENTAL CONSOLE

BACKGROUND OF THE INVENTION

In general, it is known practice to mount dental instruments on fixed cabinet structures, on cabinet structures secured to the dental chair and on moveable, typically caster supported, cabinets. The present invention is concerned with equipment of the mobile type.

The more usual prior practice, where a plurality of dental instruments are utilized selectively, has been to provide separate foot or hand controls therefore, or to provide switching on arrangements of a manual character in some convenient location. It has also been known to provide automatic selector means associated with the instruments themselves (Billin et al. U.S. Pat. No. 3,209,457; Pace applications Ser. No. 34,124, filed May 4, 1970, [U.S. Pat. No. 3,172,314 issued Jan. 23, 1973] and Ser. No. 55,664, filed July 17, 1970 [U.S. Pat. No. 3,673,709 issued July 4, 1972]).

Where a number of instruments are carried by a common support, it is known practice to provide the required slack in the hose connection by means of the usual ratchet lock on the hose reel; it is also known to use a fixed length of hose which is coiled helically, with a view to taking up slack without causing objectionable drag. In the prior Page applications mentioned above, clips for holding the hoses of instruments which are in use are disclosed, along with selector control valve means incorporated in the clips.

SUMMARY OF THE INVENTION

The invention has for its general object to improve the above-mentioned devices of the mobile cabinet type, with particular reference to provision of desired hose slack in conjunction with selection of instruments from a single accessible holder panel while protecting against fouling of the hoses and providing convenient foot control for any selected instrument.

The mobile unit of the invention has a pivotally mounted cantilever arm terminating in an instrument panel from which the various instruments extend in a position for picking up by the dentist. A clip is provided for holding the hose of the selected instrument so as to fix the amount of slack, and incorporates a selector valve control for operating selector valve mechanism within the unit housing to supply required air or water under control of the foot control associated with the unit. A slant shelf is positioned below the instruments protruding from the panel and protects against fouling the hose of and instrument which is in use against any of the remaining instruments.

Figure 2:
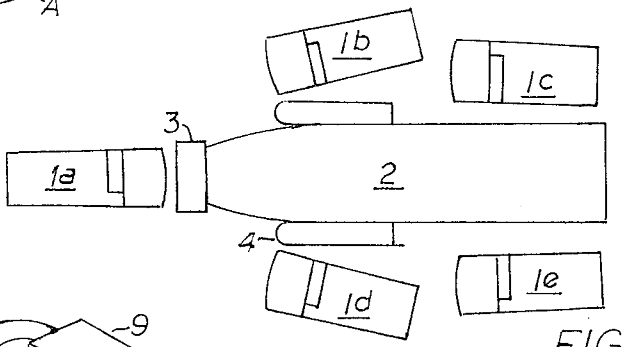
FIG. 2 is a schematic floor plan, showing various positions of the unit with relation to a dental chair.

The mobile unit of the invention, indicated generally by the numeral 1, may be used in any desired location and orientation with respect to a dental chair 2, as indicated schematically in FIG. 2. For example, the unit may be placed in back of the patient's head (position 1*a*) facing the headrest 3 of the chair, alongside either arm 4 of the chair, (positions 1*b* and 1*d*), or alongside the patient's legs, (positions 1*c* and 1*e*).

Figure 1:
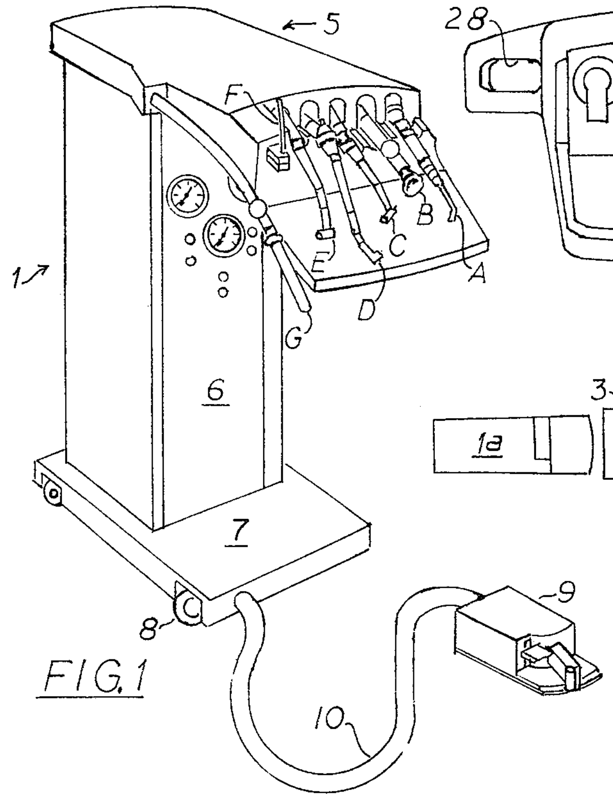
FIG. 1 is a perspective of a mobile dental unit embodying the invention in a preferred form.
Figure 4:
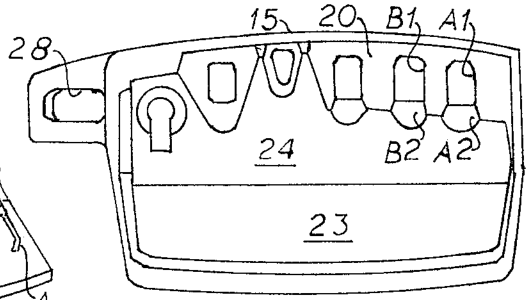
FIG. 4 is a front elevation of the instrument holding end of the unit console arm.
Figure 3:
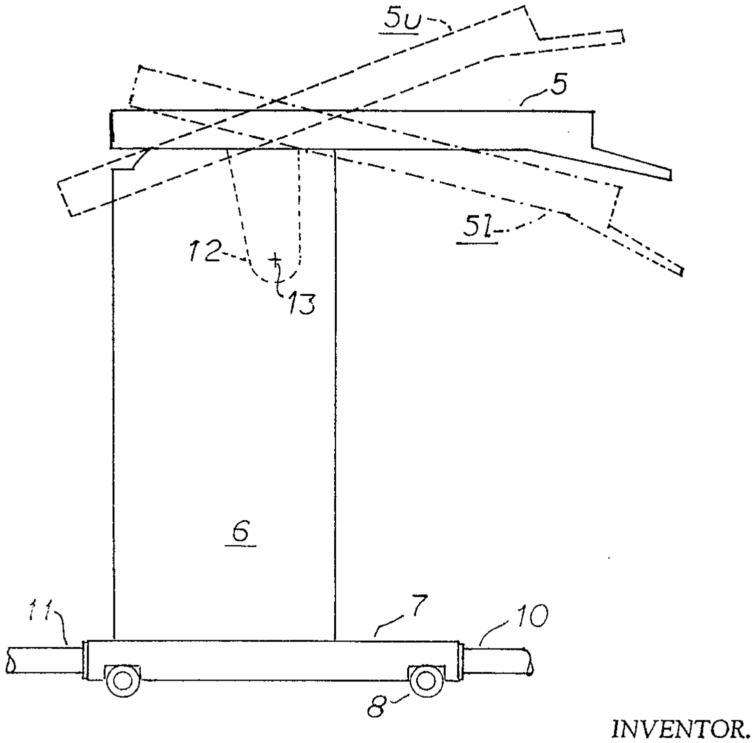
FIG. 3 is a side elevation of the unit of FIG. 3.

The mobile unit 1 has a cantilever console arm 5 which carries a selection of high and low speed contra-angle drills, handpieces and other instruments, indicated at A to E, FIG. 1, air and water syringe F, and aspirator G. The arm 5 is supported on the unit cabinet 6 by supports 12 which are mounted in the housing of cabinet 6 for pivotal movement about a horizontal axis 13 (FIG. 3). The arm 5 may be swung up into a raised position 5*u* or down into a lowered position 5*l*, adjusting to the raising or lowering of the chair, changes in the patient's posture from sitting upright to reclining, and to the preferences of the dentist as to the instrument location.

The unit base 7 is provided with casters 8, permitting the unit to be located as desired (FIG. 2) and oriented so as to face in any desired direction. The arm may extend across the patient, so that, for example, a unit in about position 1*b* may be swung around so the arm 5 extends across the patient toward the dentist adjacent the 1*d* location or 1*a* location. The foot controller 9 connects to the unit by air lines which are enclosed in corrugated flexible casing 10, and flexible air, water and electric connections 11 extend from the unit to suitable wall or floor connections.

The arrangements thus far described provide for full access to a variety of insruments with patient, dentist and assistant, if any, in convenient operating positions and attitudes.

The arrangement provides access at a distance of a foot or less, if desired, distance from instruments to the patient's mouth, while avoiding certain drawbacks of previous equipment of comparable accessability, these drawbacks being principally lack of stability of the console, lack of full control of the working fluids and likelihood of fouling of the hoses.

The console arm 5 is of "monocoque" construction, its housing being formed as a unitary structural member which supports the operating elements. The arm is formed as a molding of fiberglass or comparable synthetic resin laminate, having an inverted channel section, the upper horizontal web 15 being wide and stiffened by the depending lateral flanges 16 and terminal flange 17 at the cabinet or inboard end of the arm. The bottom of the overhanging part of the arm is closed off by a removable bottom plate 18. At the instrument or outboard end, the arm has a vertical wall panel 20, step 21 and slant shelf 22. Sheets 23 and 24 of urethane foam cover the shelf 23 and riser of the step 21, so as to avoid clatter from any instruments coming in contact therewith. The surface of the urethane sheet is fluid-tight, providing an easily sterilized and cleaned surface.

A thrust member in the form of an angle 25–26 is secured inside the housing 15–18 adjacent the panel 20 and step 21. This thrust member is a rigid, self-supporting element of suitable metal, such as stainless steel or an aluminum alloy, and carries syringe holder 26 and also the hose clips A3, B3, C3, D3, E3 for the instrument positions A, B, C, D, E respectively. The butt ends of the instruments in the positions A, etc., are received in, or against the edges of apertures A1, etc., in the vertical panel 20, with their shanks supported in grooves A2, etc., in the step 21. The ends of some instruments may drop down onto shelf 22.

The hose clips A3, etc., are shown in application 34,124 and now U.S. Pat. No. 3,712,314 issued Jan. 23, 1973, above-mentioned, and reference may be made thereto for details of their structure and operation. They are supported by the thrust member angle or bracket 25–26 adjacent the respective apertures A1, etc., so that the instrument hose is not held by the clip when the instrument is resting in a groove A2, etc., with its butt against or in the associated aperture. When the instrument is pulled out for use, its hose is pressed or snapped down so as to engage in the associated clip A3, etc., thereby giving the desired slack in the hose (usually from about one foot to two feet) and actuating the control valve of the clip in question so as to supply the required fluid or fluids to the instrument. One or more of the instruments may be operated without a clip A3, etc., as in the case of the syringe at location F. While the arrangement shown will be suitable for the dentist's selection of instruments in most cases, individual requirements are readily met by modifying an aperture A1, etc., and associated groove A2, etc., or mounting position of associated clip A3, etc., to suit. The clips themselves are adjustable for different diameters of hose and resiliency of the hose walls.

Since the removal of the instrument from its position when not in use does not, in itself, activate the fluid supply for that instrument, the assistant can remove and replace burrs in any instruments not in use, without interfering with the dentist.

The slack of the hose may pass over the end or either side of the tray or shelf 22 and may then pass under the shelf, a wide variety of such leads being possible according to the preferred operating techniques of the dentists. A tray edge may also be positioned quite close to the patient's mouth, a distance less than one foot being usual for many procedures. It has not heretofore been possible to avoid fouling the hose on instruments not in use, but the arrangement of the present invention, in which any hose in use always passes over an edge of the shelf 22, effectively eliminates this inconvenience.

Means 27, 28, 29 are provided at one side of the arm 5 for holding an aspirator (G, FIG. 1), and its hose, the holder 28 having a hose clip for fixing slack at selected amount, but no selector valve, as the suction is regulated by valve means on the instrument. This lateral mounting facilitates use by the assistant.

The arm 5 is mounted on pivoted supports 12 by means of a cross-piece 30 and longitudinal member 31, these parts being welded or otherwise fastened together and member 31 being secured to the web 15 of arm 5, as by screws engaging in inserts molded therein. Member 31 is of rectangular tubular cross-section and carries a shaft 32 fitted with separator disks 33 for guiding the instrument hoses.

Broken lines A4, etc., leading from the respective clips A3, etc., to spaces between disks 33 represent the hose connections for the various instruments. For clarity of illustration, each hose is indicated by a single line, but it will be understood that the actual hose diameter will normally be about a half inch. These hoses run along under the upper web 15, around shaft 32 (which may be fitted with guide pulleys, if desired) and down into the interior of cabinet 6 where they connect to air and water supply and regulating apparatus as shown in the above-mentioned application Ser. No. 55,664 and now U.S. Pat. No. 3,673,709 issued July 4, 1972, and are looped in a slack take-up, preferably of the gravity type.

The selector valve control air lines A5, etc., which connect to the bleed valves of the clips A3, etc., are led back along the floor 18 of the arm 5, so as to be clear of the instrument hoses A4, etc, and converge together at the end of tubular support member 31, passing along inside this member and emerging at its other end, where they pass down into the cabinet 6, connecting to the valve mechanism thereof as shown in U.S. Pat. No. 3,673,709.

By reason of its large cross-section, the arm 5 has a high cross-sectional moment of inertia and resists both flexing and twisting so as to be substantially rigid and free from the tendency to sway and vibrate or shake, which has hitherto been characteristic of cantilever-type supports for dental consoles or multiple instrument holders. Since the hose tensions and overhung weight of the arm tend to counterbalance each other, comparatively slight friction in the pivotal support 12–13 holds the arm at any angle within its range of adjustment (FIG. 3) and permits smooth and easy adjustment of this angle.

Figure 5:
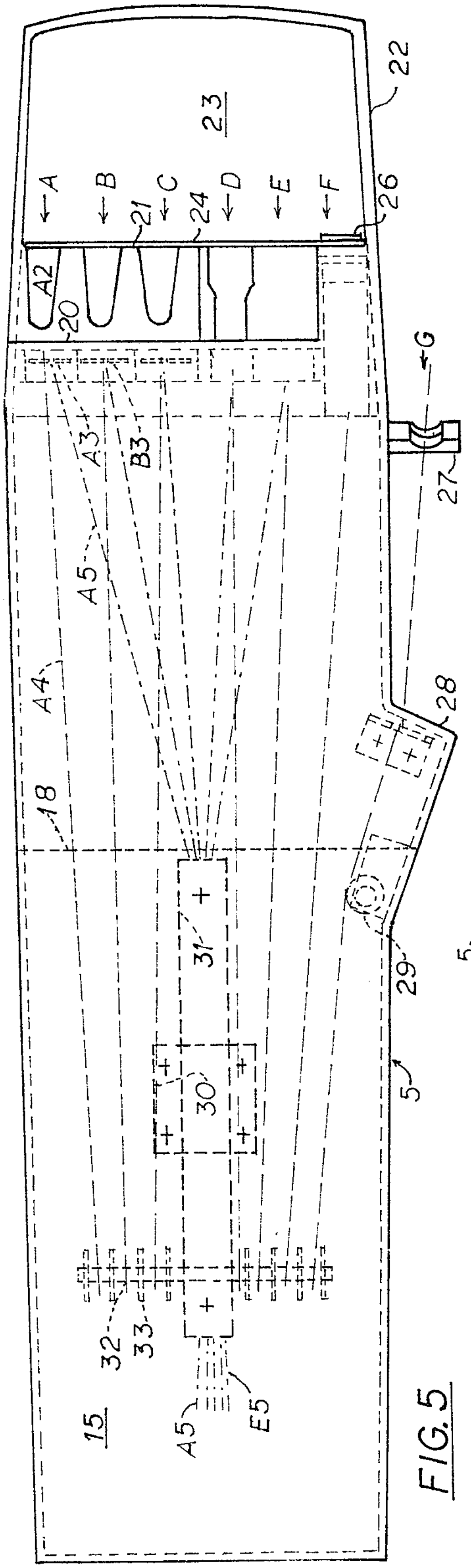
FIG. 5 is a plan view on an enlarged scale of the console arm.
Figure 6:
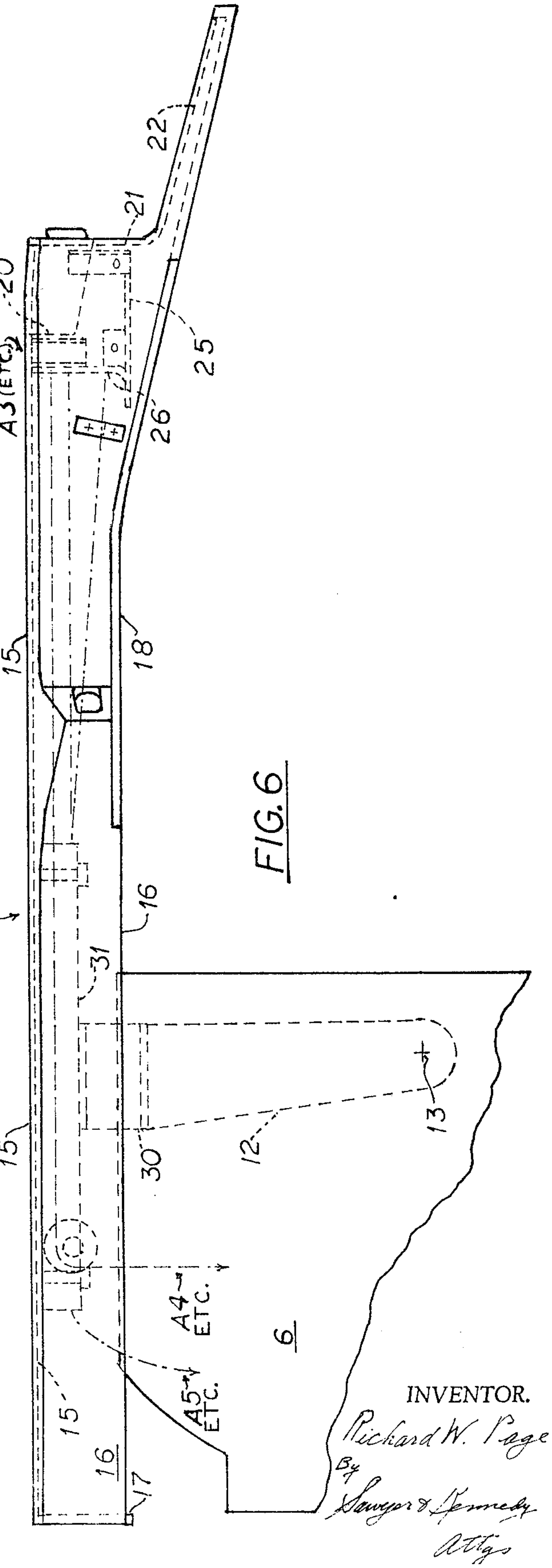
FIG. 6 is a side elevation of the arm of FIG. 5.

As will be observed from FIGS. 5 and 6, each hose, A4, etc., extends in a practically straight course almost parallel to the longitudinal axis of arm 5, as the hose passes from shaft 32 to aperture A1, etc. By pulling the hose out straight, as he picks up the instrument, the dentist will, therefore, cause no lateral or vertical shifting of the arm 5.

What is claimed is:

1. A mobile dental unit comprising a cabinet and a cantilever console arm pivotally carried thereby for up and down adjustment of its end, a panel carried by the arm at its end, and means associated with said panel for holding a row of instruments when not in use, said means comprising apertures in said panel for accommodating the instrument hoses, a row of clips positioned respectively in back of a plurality of said apertures and operable to receive and hold the hoses of said instruments when pulled out for use, each said clip being disengaged with the hose of its associated instrument when such instrument is held by the first said means in its not in use position, said arm comprising a housing which is substantially at least as wide as said panel and forms a substantially rigid cantilever support member therefor, a thrust member extending across said housing adjacent said panel and supporting the said clips, and support means and hose guide means fixed to said housing adjacent the cabinet.

2. A mobile dental unit according to claim 1, in which said arm also has a downwardly slanting shelf adjacent said panel and underlying instruments supported by the holding means associated therewith, whereby the hose of an instrument which is in use is guided around other instruments to prevent fouling therewith.

3. A mobile dental unit according to claim 2, in which the means for holding the row of instruments comprises a step havig grooves for supporting the respective instrument shanks and positioned below said apertures and between said panel and shelf.

4. A mobile unit according to claim 3, in which a resilient sound deadening sheet covers said shelf and the adjacent rise of the step.

5. A mobile dental unit according to claim 1, in which said clips comprise selector control valves operable by the respective instrument hoses when inserted therein, and said arm housing contains means for guiding tubing from said valves and the instrument hoses back to the cabinet.

6. A mobile unit according to claim 1, in which said housing is a unitary member of channel section and transmits the load of the instrument carrying overhanging end of the arm to the said support means adjacent the cabinet.

7. A mobile unit according to claim 6, in which the clips have selector valve means operable by an instrument hose when inserted therein and comprising means for leading tubing from said valves along converging paths to said support means and then into said cabinet, and comprising instrument hose guide means for guiding hoses from said clips and apertures along parallel paths above said converging paths and then into said cabinet.

* * * * *